United States Patent [19]

Gruber et al.

[11] Patent Number: 5,087,688

[45] Date of Patent: Feb. 11, 1992

[54] FIBROUS COMPOSITE STRUCTURE IMPREGNATED WITH A SOLVENT-FREE CURABLE EPOXY RESIN MATRIX

[75] Inventors: Urs Gruber, Arlesheim; Friedrich Stockinger, Courtepin; Elvio Manso, Giubiasco, all of Switzerland

[73] Assignee: Ciba-Geigy Corporation, Ardsley, N.Y.

[21] Appl. No.: 541,237

[22] Filed: Jun. 20, 1990

[30] Foreign Application Priority Data

Jun. 29, 1989 [CH] Switzerland .................. 2409/89

[51] Int. Cl.$^5$ .................................................. C08G 59/28
[52] U.S. Cl. ........................................ 528/99; 528/111; 528/93; 528/94; 523/222
[58] Field of Search ................. 528/93, 94, 99, 111

[56] References Cited

U.S. PATENT DOCUMENTS

| | | | |
|---|---|---|---|
| 2,975,155 | 3/1961 | Capron et al. | 528/111 |
| 2,994,673 | 8/1961 | Capron et al. | 528/111 |
| 4,608,300 | 9/1986 | Gruber | 428/285 |
| 4,826,921 | 5/1989 | Andrews et al. | 525/476 |
| 4,892,671 | 1/1990 | O'Neil et al. | 252/392 |
| 4,927,865 | 5/1990 | Duthaler et al. | 528/99 |
| 4,957,995 | 9/1990 | Saito et al. | 528/99 |

*Primary Examiner*—Paul R. Michl
*Assistant Examiner*—Christopher P. Rogers
*Attorney, Agent, or Firm*—Luther A. R. Hall

[57] ABSTRACT

A fibrous composite structure impregnated with a solvent-free, curable epoxy resin matrix and comprising
(a) a liquid epoxy resin or a liquid mixture of epoxy resins,
(b) a liquid $\beta$-hydroxyamine of formula I $$X-\underset{\underset{OH}{|}}{CH}-CH_2-NH_2, \quad (I)$$

wherein X is phenyl or the radical $R-O-CH_2-$, wherein R is an alkyl group of 4 to 20 carbons or is phenyl or phenyl which is substituted by one or more $C_1$-$C_4$alkyl groups, a liquid mixture of $\beta$-hydroxyamines of formula I or a liquid mixture of one more $\beta$-hydroxyamines of formula I and of a primary monomaine different from formula I or of a primary or secondary diamine, and optionally
(c) a catalytically curing tertiary amine, is virtually odourless, can be stored for several days at room temperature, and has good processing properties.

9 Claims, No Drawings

FIBROUS COMPOSITE STRUCTURE IMPREGNATED WITH A SOLVENT-FREE CURABLE EPOXY RESIN MATRIX

Prepregs based on solvent-free, curable epoxy resin mixtures which contain a hardener are normally prepared by the melt coating process in which the epoxy resin-hardener mixture (curable epoxy resin matrix) is heated to the temperature at which the viscosity of the melt is sufficiently low to wet the reinforcing material thoroughly and to impregnate it. The danger in this procedure is, however, that, in the melt, an controllable reaction between resin and hardener will ensue, i.e. that the cure will proceed to such an extent that unusable prepregs are obtained.

European patent application 0 133 154 discloses a solvent-free epoxy resin matrix for prepregs which contains a liquid epoxy resin and, as hardener, an aliphatic or cycloaliphatic primary monoamine. The prepregs so obtained are not odourless, as they contain monoamines of high vapour pressure, thereby making it necessary to take precautionary measures when processing such prepregs.

It has now been found that specific liquid $\beta$-aminoalcohols, in admixture with one another or with other specific amines, can be used as hardeners for epoxy resins such that, when mixed with an epoxy resin at room temperature (RT), they quite rapidly form a B-stage resin which is storage stable for several days at room temperature and afterwards still has good processing properties, such as a sufficient resin flow in laminate production. Prepregs which contain such a B-stage resin are virtually odourless and can be readily processed.

Accordingly, the present invention relates to a fibrous composite structure impregnated with a solvent-free, curable epoxy resin matrix and comprising (a) a liquid epoxy resin or a liquid mixture of epoxy resins, (b) a liquid $\beta$-hydroxyamine of formula I

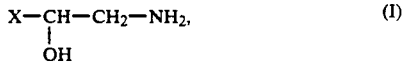

wherein X is phenyl or the radical R—O—CH$_2$—, wherein R is an alkyl group of 4 to 20 carbons or is phenyl or phenyl which is substituted by one or more C$_1$–C$_4$alkyl groups, a liquid mixture of $\beta$-hydroxyamines of formula I or a liquid mixture of one or more $\beta$-hydroxyamines of formula I and of a primary monoamine different from formula I or of a primary or secondary diamine, and optionally (c) a catalytically curing tertiary amine, said curable epoxy resin matrix containing 0.15 to 1.2 amine hydrogen equivalents of the amine component (b) and 0 to 0.1 mol of the tertiary amine (c) per 1 epoxide equivalent of the epoxy resin (a).

Preferably the curable epoxy resin matrix suitable for impregnating the fibrous composite structure will contain 0.7 to 1.1 amine hydrogen equivalents of the amine component (b) and 0 to 0.06 mol of the tertiary amine (c) per 1 epoxide equivalent.

In a preferred embodiment of the invention, the fibrous composite structure is impregnated with an epoxy resin matrix consisting of components (a), (b) and (c).

Component (a) may be a liquid epoxy resin which is based on bisphenol A or bisphenol F or on phenol novolaks or mixtures thereof in any ratio. They can be mixed with a reactive diluent such as a phenyl or cresyl glycidyl ether, butanediol glycidyl ether or hexahydrophthalic diglycidylate, preferably in an amount of 3–50% by weight, based on the total amount of the epoxy resins, or with diglycidyl aniline, preferably in an amount of 3–20% by weight, based on the total amount of the epoxy resins. Suitable mixtures of epoxy resins are also triglycidyl-p-aminophenol and tetraglycidyl-p,p'-diaminodiphenylmethane which may be mixed with butanediol diglycidyl ether or diglycidyl aniline.

The cited epoxy compounds may also be used in any desired mixtures with one another or with solid epoxy resins which are soluble in the epoxy resin mixture, provided the viscosity of the final mixtures at room temperature is lower than 4000 mPa·s, preferably lower than 1500 mPa·s.

The fibrous composite structure of this invention preferably contains, as component (a), a liquid epoxy resin based on bisphenol A or bisphenol F and optionally containing 1,4-butanediol diglycidyl ether as reactive diluent.

The fibrous composite structures of this invention preferably contain $\beta$-hydroxyamines of formula I, wherein X is phenyl or the radical R—O—CH$_2$—, wherein R is a C$_1$–C$_4$alkyl-substituted phenyl radical. The $\beta$-hydroxyamines of formula I are known, for example from European patent application 0 252 007, and can be prepared by reacting glycidyl compounds of formula II

wherein X is as defined in formula I, with ammonia to give compounds of formula I.

If component (b) of the curable epoxy resin matrix is a liquid mixture of $\beta$-hydroxyamines of formula I, then it is preferred to use a mixture of 2-hydroxy-2-phenylethylamine with 2-hydroxy-3-(m-ethylphenoxy)propylamine, 2-hydroxy-3-(o-cresyloxy)-propylamine, 2-hydroxy-3-(o-isopropylphenoxy)propylamine or 2-hydroxy-3-(o-sec-butylphenoxy)propylamine or a mixture of 2-hydroxy-3-(o-cresyloxy)propylamine with 2-hydroxy-3-(sec-butylphenoxy)propylamine or 2-hydroxy-3-(o-isopropylphenoxy)propylamine.

If component (b) of the curable epoxy resin matrix is a liquid mixture of one or more $\beta$-hydroxyamines of formula I and of a primary monoamine which differs from formula I, then said mixture contains this monoamine preferably in amounts of less than 50% by weight, most preferably of less than 30% by weight, based on all amines of component (b). Likewise, when using a mixture of one or more $\beta$-hydroxyamines and a primary or secondary diamine as component (b), the amount of diamine is preferably less than 50% by weight, most preferably less than 30% by weight, based on all amines of components (b).

Primary monoamines differing from formula I may suitably be all monoamines which, together with the $\beta$-hydroxyamine of formula I, form a liquid mixture.

Representative examples of such primary monoamines are aniline, benzylamine, cyclohexylamine, ethanolamine, 2-ethylhexylamine, 2-phenylethylamine, 3-(2-ethylhexoxy)propylamine, n-octylamine, 2-butoxyethylamine, 2-(2-hydroxyethoxy)-1-ethylamine, 3-isopropoxy-1-propylamine or 3-amino-2,2-dimethylpropan-1-ol. These compounds are known and some are commercially available.

Suitable primary or secondary diamines are also all diamines which form a liquid mixture with the β-hydroxyamines of formula I. Primary diamines which may suitably be used are typically aliphatic, cycloaliphatic, aromatic or heterocyclic amines such as bis(4-aminophenyl)methane, aniline/formaldehyde resins, bis(4-aminophenyl)sulfone, propane-1,3-diamine, hexamethylenediamine, diethylenetriamine, triethylenetetramine, 2,2,4-trimethylhexane-1,6-diamine, m-xylylenediamine, bis(4-aminocyclohexyl)methane, 2,2-bis(4-aminocyclohexyl)propane, 3-aminomethyl-3,5,5-trimethylcyclohexylamine (isophoronediamine) or bis(3-methyl-4-aminocyclohexyl)methane.

Suitable secondary diamines (b) are typically piperazine, N,N'-dicyclohexylhexamethylene-1,6-diamine- or N,N'-bis(β-cyanoethyl)hexamethylene-1,6-diamine.

The cited primary and secondary diamines are known compounds and most are commercially available.

As component (b) it is preferred to use a β-hydroxyamine of formula I, a mixture of β-hydroxyamines of formula I or a mixture of one or more β-hydroxyamines of formula I and a primary diamine.

The tertiary amines (c) used as catalytic hardeners are also known hardeners for epoxy resins, some of which are commercially available. Such hardeners are described, for example, by H. Lee und K. Neville in "Handbook of Epoxy Resins", 1967, Chapter 9, for example benzyldimethylamine, 2-(dimethylaminomethyl)phenol or 2,4,6-tris(dimethylaminomethyl)phenol. Besides the compounds named therein, it is also possible to use the imidazoles disclosed in European patent application A1 0 018 949 or the known imidazoles of formulae

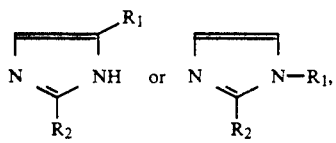

wherein $R_1$ and $R_2$ are each independently of the other a hydrogen atom, methyl, ethyl, propyl, or phenyl. The imidazoles of the above formula are preferred catalytic hardeners.

The conventional fibres used for the fibre reinforcement of moulding materials may be used as reinforcing fibres for the fibrous composite structure of this invention. These fibres may be organic or inorganic fibres, natural fibres or synthetic fibres, and may be in the form of woven or nonwovens, fleeces or mats, as well as in the form of rovings, staple fibres or continuous filaments. Exemplary of reinforcing fibres used are glass, asbestos, boron, carbon or metal fibres as well as aramide fibres, high-strength polyester fibres or natural fibres of cotton or synthetic wool. Such fibres and fabrics made therefrom are commercially available.

Coating these fibres and fabrics with the solvent-free epoxy resin mixture may be effected by the customary impregnating methods, by coating, spraying or immersion, by extrusion or, in the case of continuous filaments, by filament winding.

The fibrous materials coated with the matrix resin can be dried in the air at room temperature, whereupon the matrix resin is converted quite rapidly into the still fusible and curable B-stage to form prepregs which are stable at room temperature for several days. As the matrix resin used for impregnating is solvent-free, it is also possible, prior to the final cure, to dispense with the process step for the complete removal of solvent from the fibrous composite structure—a step necessary to prevent the formation of any pores or perforations in the cured fibrous composite structure caused by the evaporation of residual solvent.

The preparation of prepregs from the fibrous composite structure is hence linked to the advantage that the appropriate process steps for evaporating the solvent and for advancing the resin are unnecessary and no consumption of heat energy is required.

The fibrous composite structure is preferably in the form of prepregs which may be used in known manner for the preparation of laminates.

The prepregs of this invention may be completely cured in the range from room temperature to below 120° C., and are therefore useful for the preparation of fibrous composite systems with other materials, especially those which have poor resistance to temperatures above 120° C., such as wood or plastics materials having a low softening point, for example ABS polymers, polyethylene or PVC.

Accordingly, the present invention relates to a fibrous composite system, especially a laminate, which is obtained from the fibrous composite structure of this invention, optionally together with other materials, by shaping and crosslinking the resin matrix.

The resin flow indicated in the following Examples is determined as follows: 2 rectangular prepreg pieces having an edge length of 5 cm are laid exactly on top of each other, and then placed between 2 release papers or films in a press heated to 100° C. The press is closed immediately and a pressure of 2 MPa is applied. After 5 minutes the laminate is removed from the hot press and the resin exuding along the edges is measured. For an adequate flow, this must be not less then 5 mm long.

The usefulness of a prepreg is normally determined from its flow. If the flow is too low, i.e. smaller than 5 mm, then a prepreg can usually no longer be compressed to a good laminate.

The glass transition temperature ($T_G$) is determined on a TMA 40 thermomechanical analyzer supplied by Mettler AG. The load on the penetrating plunger is 0.5 N/mm$^2$, heating up rate=10° C./min. The analyzer determines the $T_G$ fully automatically.

The β-hydroxyamines of formula I used in the Examples were prepared as follows:

2-Hydroxy-3-butoxypropylamine

A 10 liter reactor with ground glass stopper and fitted with condenser, dropping funnel, thermometer and stirrer, is charged with 4.987 liters (73.3 mol) of aqueous ammonia solution (25%) and 2.0 liters of ethyl alcohol. With stirring, 911.33 g (7.00 mol) of butyl glycidyl ether are added dropwise to the mixture at 22° C. over ca. 1 hour, the temperature rising to ca. 35° C. The reaction mixture is thereafter stirred for 4 hours and then the solvent is removed at 80°-90° C./39 mbar, affording 960.0 g of a low-viscosity oil which has a purity of 75% (gas chromatographic analysis). The crude product is distilled under a high vacuum to give 485.0 g of 2-hydroxy-3-butoxypropylamine in 97% purity (gas chromatographic analysis) at 76° to 78° C./0.013–0.026 mbar.

2-Hydroxy-3-(o-sec-butylphenoxy)propylamine

A 2.5 liter autoclave is charged, at room temperature and under nitrogen blanketing, with 429 g (2.1 mol) of o-sec-butylphenyl glycidyl ether and 30.2 g of water. Then 698.5 g (41.08 mol) of ammonia gas is blown in under pressure over 5 minutes and the reaction mixture is thereafter heated to 80° C. over 2 hours. After 1 hour at 80° C., the reaction mixture is cooled to room temperature, the pressure in the system is removed and the reaction product is concentrated on a rotary evaporator at 80° C./13 mbar. Gas chromatographic analysis shows the resultant amine to be 92.5% pure. It has a viscosity of 1240 mPa·s.

2-Hydroxy-3-(o-cresyloxy)propylamine

As previously described, the addition of ammonia to o-cresyl glycidyl ether is carried out in an autoclave. The amine so obtained has a purity of 96% and consists of colourless crystals with a melting point of 64° C.

2-Hydroxy-3-[2,6-bis(sec-butyl)phenoxy]propylamine

A 2.5 liter autoclave is charged, at room temperature and under nitrogen blanketing, with 440 g (1.667 mol) of 2,6-bis(sec-butyl)phenyl glycidyl ether and 30.2 g of water. Then 698.5 g (41.08 mol) of ammonia gas is blown in under pressure over 5 minutes and the reaction mixture is thereafter heated to 80° C. over 2 hours. After 1 hour at 80° C., the reaction mixture is cooled to room temperature, the pressure in the system is removed and the reaction product is concentrated on a rotary evaporator at 80° C./13 mbar. Yield: 436.1 g (93% of theory) of a brownish liquid reaction product which is purified by flash distillation. The boiling point is 170° C./0.13 mbar and the amine content is 3.548 meq/g (=99.1% of theory).

EXAMPLE 1

100 g of bisphenol A diglycidyl ether having an epoxy value of 5.35 eq/kg are mixed with 13.7 g of 2-hydroxy-3-butoxypropylamine (0.35 NH eqivalents/epoxide eqivalents) and 2.7 g (0.01 mol) of 2,4,6-tris(-dimethylaminomethyl)phenol. A glass fabric (Interglas 92146) is impregnated with this mixture at room temperature using a laminating hook. The resultant prepreg is left to lie between two polyethylene films at room temperature and changes in its properties are monitored from time to time.

Gelation time at 100° C. (heating plate):
fresh mixture = 10 min 35 sec
after storage for 1 day at RT = 7 min 45 sec
heat resistance of the prepreg after curing at 100° C. for 60 min: $T_G$=79° C.
heat resistance of the prepreg stored for 1 day at RT after curing for 30 min at 100° C.: $T_G$=78° C.

EXAMPLE 2

A mixture is prepared from 100 g of bisphenol A diglycidyl ether having an epoxy value of 5.35 eq/kg, 19.5 g of 2-hydroxy-3-butoxypropylamine (0.485 NH equivalent/epoxide equivalent) and 15.8 g of bis(3-methyl-4-aminocyclohexyl)methane (0.5 NH equivalent/epoxide equivalent). Prepregs are prepared from this mixture as in Example 1.

Gelation time at 100° C. (heating plate):
fresh mixture = 7 min 40 sec
prepreg after storage for 1 day at RT = 4 min 5 sec
prepreg after storage for 2 days at RT = 2 min 59 sec
prepreg after storage for 5 days at RT = 35 sec The prepreg is no longer tacky after storage for ca. 1 day at RT. After storage for 7 days at RT the resin flow of the laminate is still 5 mm, i.e. the shelf life of the prepreg at RT is at least 7 days.

Heat resistance of the prepreg after curing for 20 min at 100° C.: $T_G$=63° C.

EXAMPLES 3-5

Mixtures are prepared as described in Example 1 from the components listed in Table 1 and processed to prepregs and laminates whose properties are also stated in Table 1.

Epoxy resin A: bisphenol F diglycidyl ether having an epoxy value of 6.2 eq/kg and a viscosity of 6000 mPa·s at 25° C.

Epoxy resin B: mixture of 85 g of bisphenol A diglycidyl ether and 15 g of 1,4-butanediol diglycidyl ether having a mixed epoxy value of 5.85 eq/kg and a mixed viscosity of 1250 mPa·s at 25° C.

Epoxy resin C: mixture of 96 g of bisphenol A diglycidyl ether and 4 g of 1,4-butanediol diglycidyl ether having a mixed epoxy value of 5.7 eq/kg and a mixed viscosity of 4000 mPa·s at 25° C.

Amine I: liquid mixture of 55.7 g of 2-hydroxy-3-(o-sec-butylphenoxy)propylamine and 44.24 g 2-hydroxy-3-(o-cresyloxy)propylamine.

The TECAM pot life is determined according to British Standard 3532 (1967) using a Tecam ®-Geltimer machine supplied by Techma Ltd., Cambridge. In this test, the time is measured until a plunger moving up and down is no longer able to move in 100 g of resin/hardener mixture owing to gelation of the mixture (initial temperature 23° C.).

TABLE 1

|  | Example | | |
|---|---|---|---|
|  | 3 | 4 | 5 |
| epoxy resin A (g) | 100 | | |
| epoxy resin B (g) | | 100 | |
| epoxy resin C (g) | | | 100 |
| epoxy value | 0.62 | 0.585 | 0.57 |
| amine I (g) | 26 | 26 | 26 |
| NH equivalents | 0.24 | 0.24 | 0.24 |
| NH equivalents/epoxy equivalent | 0.39 | 0.41 | 0.42 |
| bis(3-methyl-4-aminocyclohexyl)methane (g) | 3.6 | 3.5 | 3.5 |
| NH equivalents | 0.061 | 0.059 | 0.059 |
| NH equivalents/epoxy equivalent | 0.098 | 0.101 | 0.104 |
| 2-methylimidazole (g) | 1.6 | 1.5 | 1.5 |
| mol | 0.02 | 0.018 | 0.018 |
| mol/epoxy equivalent | 0.032 | 0.031 | 0.032 |
| mixed viscosity at 25° C. (mPa · s) | 1250 | 1340 | 2890 |
| pot life (TECAM) at 23° C. (min) | 185 | 130 | 191 |
| gelation time at 100° C., fresh mixture (min' sec") | 12'20" | 13'25" | 11'55" |
| after storage for 1 day at 23° C. | 7'20" | 8'10" | 6'40" |
| after storage for 2 days at 23° C. | 6' | 5'45" | 6' |
| after storage for 5 days at 23° C. | 2'35" | 45" | 2'24" |
| maturing of the prepreg at 20° C., dry B-stage after (h) | 7 | 7 | 6 |
| storage of the prepreg at 23° C., still sufficient flow after (days) | 10 | 5-6 | 14 |
| $T_G$ of the cured laminate after curing | | | |
| 1 day at 23° C. and 20 min at 100° C. | 82° | 79° | 90° |
| 1 day at 23° C. and 30 min at 100° C. | 89° | 77° | 90° |

EXAMPLES 6-8

Homogeneous mixtures are prepared at room temperature from the amounts indicated in Table 2 of resin, hardener and accelerator. Glass fabrics (Interglas 91 745 having a surface area of 294 g/m²) are impregnated such that a resin content of ca. 38 to 46% by weight results. Each impregnated piece of glass fabric is stored between two polyethylene sheets in a climatic chamber and assessed daily for flexibility, tackiness, gelation time and flow (at 100° C.).

After storage for 1 day, two pieces measuring 5×5 cm and impregnated with the same resin mixture are cured for precisely 20 minutes between 2 release films in a press heated exactly to 100° C. at a pressure of only 5 bar.

Epoxy resin D: bisphenol F diglycidyl ether having an epoxy value of 6.1 equivalents/kg and a viscosity of 1500 mPa·s at 25° C.

Epoxy resin E: bisphenol A diglycidyl ether having an epoxy value of 5.3 equivalents/kg and a viscosity of 10000 to 12000 mPa·s at 25° C.

Epoxy resin F: 1,4-butanediol diglycidyl ether having an epoxy value of 8.9 equivalents/kg and a viscosity of 15 mPa·s at 25° C.

TABLE 2

|  | Example 6 | 7 | 8 |
|---|---|---|---|
| epoxy resin D (g) | 100 | | |
| epoxy resin E (g) | | 85 | 85 |
| epoxy resin F (g) | | 15 | 15 |
| epoxy equivalents | 0.61 | 0.58 | 0.58 |
| 2-hydroxy-3-[2,6-bis(sec-butyl)phenoxy]-propylamine (g) | 48.4 | 34.0 | 39.0 |
| 3,3'-dimethyl-4,4'-diaminodicyclohexyl-methane (g) | | 3.5 | |
| 4-(3-aminopropyl)morpholine (g) | | | 2.9 |
| NH equivalents | 0.3 | 0.271 | 0.284 |
| 1-methylimidazole (g) | 2.5 | 2.0 | 2.0 |
| mol 0.03 | 0.024 | 0.024 | |
| mixed viscosity at 25° C. (mPa · s) | 1700 | 1670 | 1484 |
| pot life (TECAM) at 23° C. (min) | 378 | 351 | 287 |
| gelation time at 100° C., fresh mixture (min' sec") | 13'30" | 13'10" | 13'35" |
| after storage for 1 day at 23° C. | 7'40" | 7'20" | 9'00" |
| after storage for 5 days at 23° C. | 3'25" | 50" | 1'30" |
| after storage for 12 days at 23° C. | 55" | | |
| storage of the prepreg at 23° C., sufficient flow still after (days) | 14 | 5 | 4–5 |
| $T_G$ of the cured laminates after curing for 1 day at 23° C. and 20 min at 100° C. (°C.) | 75 | 79 | 70 |

What is claimed is:

1. A fibrous composite structure impregnated with a solvent-free, curable epoxy resin matrix and comprising (a) a liquid epoxy resin or a liquid epoxy resin mixture, (b) a liquid β-hydroxyamine of formula I $$X-CH-CH_2-NH_2, \quad (I)$$
$$\phantom{X-C}|$$
$$\phantom{X-CH-}OH$$

wherein X is phenyl or the radical R—O—CH$_2$—, wherein R is an alkyl group of 4 to 20 carbons or is phenyl or phenyl which is substituted by one or more C$_1$-C$_4$alkyl groups, a liquid mixture of β-hydroxyamines of formula I or a liquid mixture of one or more β-hydroxyamines of formula I and of a primary monoamine different from formula I or of a primary or secondary diamine, and (c) a catalytically curing tertiary amine, said curable epoxy resin matrix containing 0.15 to 1.2 amine hydrogen equivalents of the amine component (b) and 0 to 0.1 mol of the tertiary amine (c) per 1 epoxide equivalent of the epoxy resin (a).

2. A fibrous composite structure according to claim 1, which contains 0.7 to 1.1 amine hydrogen equivalents of the amine component (b) and 0 to 0.06 mol of the tertiary amine (c) per 1 epoxide equivalent.

3. A fibrous composite structure according to claim 1, which contains a curable epoxy resin matrix consisting of components (a), (b) and (c).

4. A fibrous composite structure according to claim 1, which contains a β-hydroxyamines of formula I, wherein X is phenyl or the radical R—O—CH$_2$—, wherein R is a C$_1$-C$_4$alkyl-substituted phenyl radical.

5. A fibrous composite structure according to claim 1, wherein component (b) is a β-hydroxyamine of formula I, a mixture of β-hydroxyamines of formula I or a mixture of one or more β-hydroxyamines of formula I and a primary diamine.

6. A fibrous composite structure according to either claim 1 or claim 3, wherein component (c) is an imidazole.

7. A fibrous composite structure according to claim 1, which is in the form of a prepreg.

8. A fibrous composite structure, prepared from the fibrous composite structure as claimed in claim 1, by shaping and crosslinking the resin matrix.

9. A fibrous composite structure according to claim 8, which is in the form of a laminate.

* * * * *